United States Patent
Mori

(10) Patent No.: US 10,915,308 B2
(45) Date of Patent: Feb. 9, 2021

(54) CONSTRUCTION MACHINE AND PROGRAM REWRITING SYSTEM PROVIDED WITH SAME

(71) Applicant: KOBELCO CONSTRUCTION MACHINERY CO., LTD., Hiroshima (JP)

(72) Inventor: Hisanobu Mori, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 158 days.

(21) Appl. No.: 15/750,006

(22) PCT Filed: Aug. 3, 2016

(86) PCT No.: PCT/JP2016/072725
§ 371 (c)(1),
(2) Date: Feb. 2, 2018

(87) PCT Pub. No.: WO2017/029985
PCT Pub. Date: Feb. 23, 2017

(65) Prior Publication Data
US 2018/0210722 A1   Jul. 26, 2018

(30) Foreign Application Priority Data
Aug. 20, 2015  (JP) ................. 2015-162519

(51) Int. Cl.
*G06F 8/65*       (2018.01)
*B60R 16/02*    (2006.01)
(Continued)

(52) U.S. Cl.
CPC ............... *G06F 8/65* (2013.01); *B60R 16/02* (2013.01); *E02F 9/20* (2013.01); *E02F 9/2058* (2013.01); *G06F 11/00* (2013.01); *Y02D 10/00* (2018.01)

(58) Field of Classification Search
None
See application file for complete search history.

(56) References Cited

U.S. PATENT DOCUMENTS 6,614,361 B1 * 9/2003 Kinugawa ............... B60R 25/00
340/870.16
9,092,288 B2 * 7/2015 Nagai ....................... G06F 8/61
(Continued)

FOREIGN PATENT DOCUMENTS

CN   1940872 A   4/2007
JP   2004-21680 A   1/2004
(Continued)

OTHER PUBLICATIONS

International Search Report dated Sep. 13, 2016, in PCT/JP2016/072725, filed Aug. 3, 2016.
(Continued)

*Primary Examiner* — Christian Chace
*Assistant Examiner* — Michael F Whalen
(74) *Attorney, Agent, or Firm* — Oblon, McClelland, Maier & Neustadt, L.L.P.

(57) ABSTRACT

A hydraulic shovel includes a control device including: a vehicle controller for storing a program and configured to execute rewriting processing of rewriting the program by an update program, and a communication controller configured to store the update program received from the server; and a rewriting determination part to detect whether or not the hydraulic shovel is in an electric power supply state in which electric power is supplied to an electrical component. The (Continued)

control device starts transfer of the update program from the communication controller to the vehicle controller when the rewriting determination part detects that the hydraulic shovel is not in an electric power supply state, and suspends transfer of the update program when the rewriting determination part detects that the hydraulic shovel is in an electric power supply state after the transfer is started and before the transfer is completed.

4 Claims, 7 Drawing Sheets

(51) Int. Cl.
*G06F 11/00* (2006.01)
*E02F 9/20* (2006.01)

(56) References Cited

U.S. PATENT DOCUMENTS

| | | | | |
|---|---|---|---|---|
| 10,625,754 | B2* | 4/2020 | Izumi | G06F 8/65 |
| 2004/0002793 | A1 | 1/2004 | Tachibana et al. | |
| 2005/0256614 | A1* | 11/2005 | Habermas | B60L 3/12 |
| | | | | 701/1 |
| 2006/0161314 | A1 | 7/2006 | Honmura | |
| 2007/0100513 | A1* | 5/2007 | Asano | G08G 1/0104 |
| | | | | 701/2 |
| 2007/0185624 | A1 | 8/2007 | Duddles et al. | |
| 2012/0124571 | A1 | 5/2012 | Nagai et al. | |
| 2013/0079950 | A1 | 3/2013 | You | |
| 2015/0212745 | A1 | 7/2015 | Li et al. | |
| 2017/0075678 | A1* | 3/2017 | Kurosawa | G06F 8/65 |
| 2017/0090907 | A1* | 3/2017 | Kurosawa | G06F 8/654 |
| 2018/0024827 | A1* | 1/2018 | Iwasaki | G06F 11/1433 |
| | | | | 717/172 |
| 2019/0361696 | A1* | 11/2019 | Nakano | G06F 8/65 |
| 2020/0034140 | A1* | 1/2020 | Arai | H04L 67/34 |
| 2020/0065087 | A1* | 2/2020 | Miura | B60R 16/023 |

FOREIGN PATENT DOCUMENTS

| | | | |
|---|---|---|---|
| JP | 4487007 B | | 6/2010 |
| JP | 2010-176246 A | | 8/2010 |
| JP | 2012-103181 A | | 5/2012 |
| JP | 2015-101229 A | | 6/2015 |
| JP | 2017014722 A | * | 1/2017 |

OTHER PUBLICATIONS

Extended European Search Report dated Aug. 13, 2018 in Patent Application No. 16836976.7.
Chinese Office Action dated Jul. 1, 2020 in corresponding Chinese Patent Application No. 201680046728.5 (with partial English translation), 10 pages.

* cited by examiner

CONSTRUCTION MACHINE AND PROGRAM REWRITING SYSTEM PROVIDED WITH SAME

TECHNICAL FIELD

The present invention relates to a technique for rewriting a program which executes various controls during working, collects vehicle information such as a cumulative operation time, transmits and receives data to and from the outside, and executes other controls in a construction machine such as a shovel.

BACKGROUND ART

For example, a program rewriting control system described in Patent Literature 1 includes a server exclusively used for rewriting, and a construction machine communicative with the server exclusively used for rewriting.

The construction machine includes a communication controller communicative with the server exclusively used for rewriting via a communication means such as a mobile phone base station, and an information collecting controller connected to the communication controller via a communication line within a vehicle body and configured to store a currently used program.

The server exclusively used for rewriting receives vehicle state data collected by the information collecting controller via the communication controller, and determines whether or not the construction machine satisfies a program rewritable condition (hereinafter, simply referred to as a rewriting condition) based on the vehicle state data. Further, the server exclusively used for rewriting transmits an update program to the construction machine when it is determined that the construction machine satisfies the rewriting condition.

When the information collecting controller receives an update program from the server exclusively used for rewriting via the communication controller, the information collecting controller rewrites the currently used program by the update program.

The rewriting condition includes a state that the construction machine is not in operation, in other words, a state that a key switch is in an off-state (a state that electric power supply to an electrical component mounted in the construction machine is stopped).

In the construction machine described in Patent Literature 1, when program rewriting is started in an off-state of the key switch, the program rewriting is continued even when the key switch is turned on thereafter.

However, the information collecting controller is required to execute processing for collecting information on the construction machine, and program rewriting processing concurrently in the aforementioned state. Therefore, there is an inconvenience that a high processing power is required for the information collecting controller.

CITATION LIST

Patent Literature

Patent Literature 1: Japanese Patent No. 4487007

SUMMARY OF INVENTION

An object of the present invention is to provide a construction machine and a program rewriting system provided with the same, which enable to minimize processing power required for a controller which executes program rewriting processing.

In order to solve the aforementioned inconvenience, the present invention provides a construction machine including: a control device having a vehicle controller for storing a currently used program and configured to execute rewriting processing of rewriting the program by an update program, and a communication controller communicative with a server including the update program via a communication means and configured to store the update program received from the server; and an electric power supply state detector for detecting whether or not the construction machine is in an electric power supply state in which electric power is supplied to an electrical component mounted in the construction machine. The control device starts transfer of the update program from the communication controller to the vehicle controller when the electric power supply state detector detects that the construction machine is not in an electric power supply state, and suspends transfer of the update program when the electric power supply state detector detects that the construction machine is in an electric power supply state after the transfer is started and before the transfer is completed.

According to the present invention, it is possible to minimize processing power required for a controller which executes program rewriting processing.

DESCRIPTION OF EMBODIMENTS

In the following, embodiments of the present invention are described with reference to the accompanying drawings. The following embodiments are examples exemplifying the present invention, and do not limit the technical scope of the present invention.

First Embodiment

Figure 1:
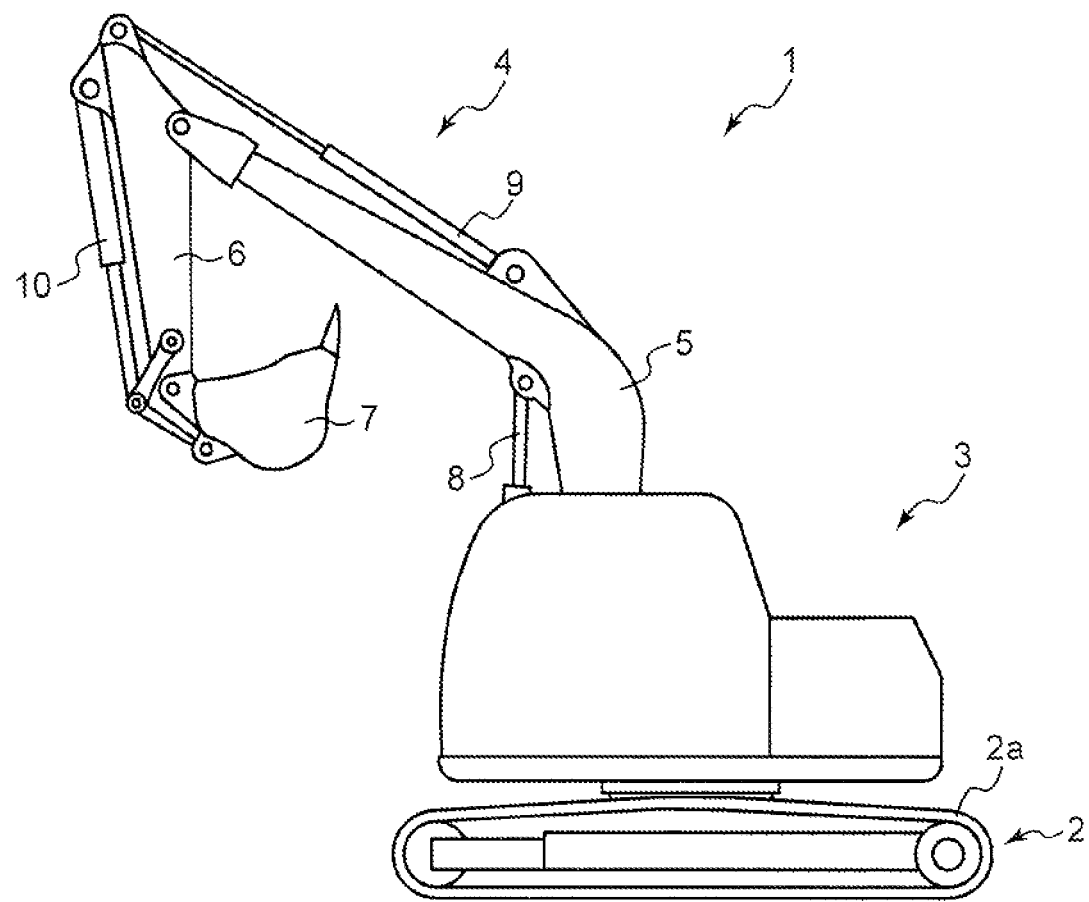
FIG. 1 is a side view illustrating an overall configuration of a hydraulic shovel according to a first embodiment of the present invention.

Referring to FIG. 1, a hydraulic shovel 1 as an example of a construction machine according to the first embodiment of the present invention includes a lower traveling body 2 having a crawler 2a, an upper slewing body 3 slewably mounted on the lower traveling body 2, and an attachment 4 attached to the upper slewing body 3.

The attachment 4 includes a boom 5 having a base end rotatably mounted on the upper slewing body 3, an arm 6 having a base end rotatably mounted on a distal end of the boom 5, and a bucket 7 rotatably mounted on a distal end of the arm 6.

Further, the attachment 4 includes a boom cylinder 8 for driving and rotating the boom 5 with respect to the upper slewing body 3, an arm cylinder 9 for driving and rotating the arm 6 with respect to the boom 5, and a bucket cylinder 10 for driving and rotating the bucket 7 with respect to the arm 6.

Figure 2:
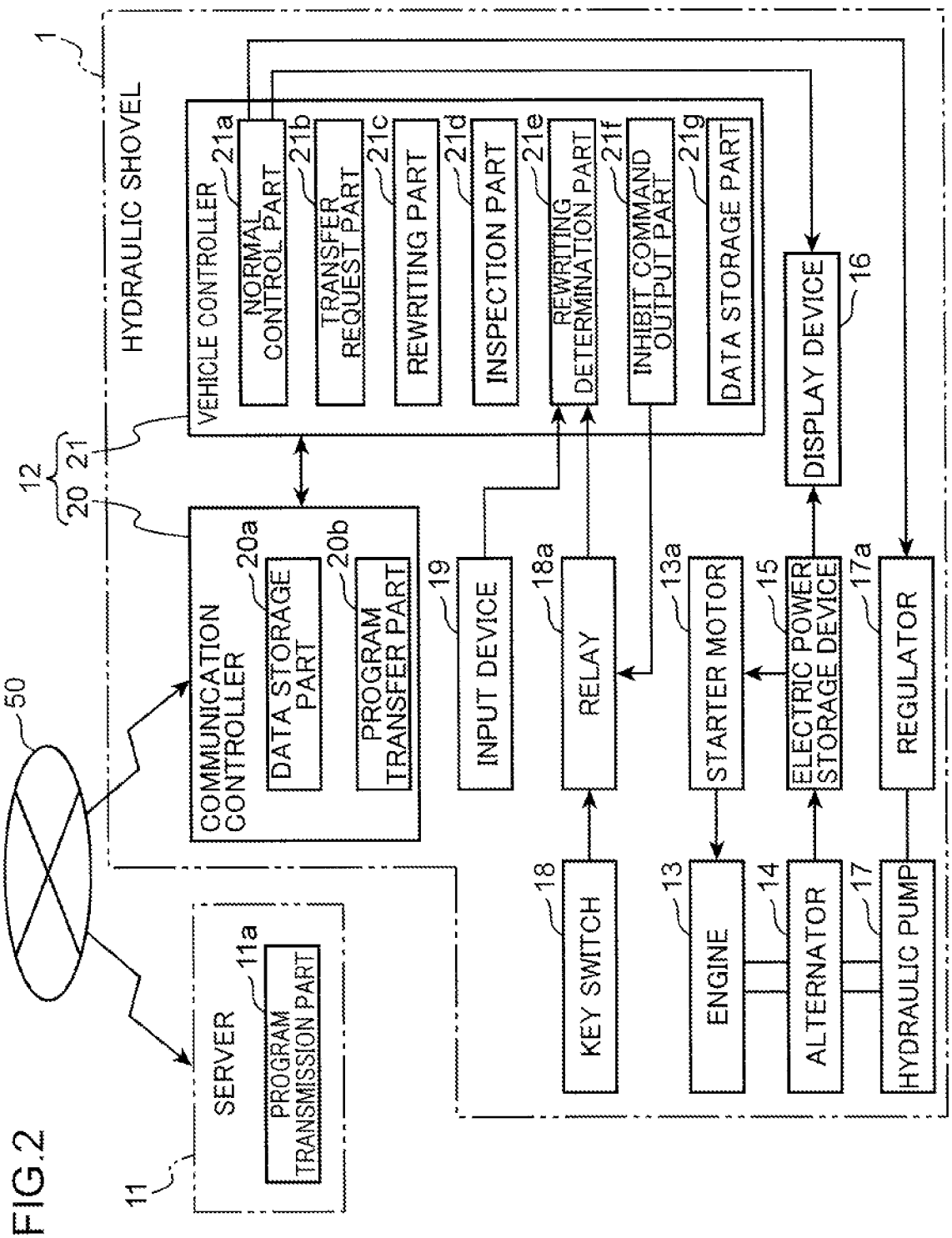
FIG. 2 is a block diagram illustrating an electrical configuration of a program rewriting system including the hydraulic shovel illustrated in FIG. 1.

FIG. 2 is a block diagram illustrating an electrical configuration of a program rewriting system including the hydraulic shovel 1.

Referring to FIG. 2, the program rewriting system includes the hydraulic shovel 1, and a server 11 communicatively connected to the hydraulic shovel 1 via a communication means (e.g. a mobile phone communication network) 50.

The server 11 includes an update program for rewriting a program stored in the hydraulic shovel 1, which will be be described later. Further, the server 11 includes a program transmission part 11a for transferring an update program to the hydraulic shovel 1 via the communication means 50.

On the other hand, the hydraulic shovel 1 includes an engine 13, a starter motor 13a for starting the engine 13, an alternator 14 for generating electric power by using power of the engine 13, an electric power storage device 15 for storing electric power generated by the alternator 14, a capacity-variable hydraulic pump 17 for discharging hydraulic oil by using power of the engine 13, and a regulator 17a for adjusting a tilt of the hydraulic pump 17.

Further, the hydraulic shovel 1 includes a display device (an example of an electrical component mounted in the hydraulic shovel 1) 16 for displaying predetermined information, an input device 19 for inputting a predetermined command to a control device 12 to be described later, a key switch (an electric power supply state detector) 18 for switching an electric power supply state with respect to an electrical component including the display device 16, and a relay (an electric power supply inhibit unit) 18a disposed between the key switch 18 and the control device 12 to be described later. The key switch 18 is switchable between an OFF position at where electric power supply to an electrical component including the display device 16 is stopped, an ON position at which electric power is supplied from at least one of the electric power storage device 15 and the alternator 14 to an electrical component including the display device 16, and a start position at which electric power is supplied to the starter motor 13a for starting the engine 13. The start position is an operation position included in the ON position. Further, electric power is supplied from the electric power storage device 15 to the control device 12 to be described later when the key switch 18 is in the OFF position.

Further, the hydraulic shovel 1 includes the control device 12 for storing a currently used program, and configured to execute rewriting processing of rewriting the program by an update program by using electric power from the electric power storage device 15 in a state that the engine 13 is stopped.

In this example, the program is a program for executing various controls during working, collecting vehicle information such as a cumulative operation time, transmitting and receiving data to and from the outside, and executing other controls of the hydraulic shovel 1 in cooperation with hardware resources such as a CPU, an RAM, and an ROM.

Specifically, the control device 12 includes a communication controller 20 communicative with the server 11 via the communication means 50, and a vehicle controller 21 for transmitting and receiving data to and from the communication controller 20 by using controller area network (CAN) communication.

The communication controller 20 includes a data storage part 20a for storing an update program transferred from the server 11, and a program transfer part 20b for transferring the update program stored in the data storage part 20a to the vehicle controller 21 in response to a request from the vehicle controller 21.

Further, the communication controller 20 notifies the vehicle controller 21 of the presence of an update program when the update program is stored in the data storage part 20a.

The vehicle controller 21 stores a currently used program, and executes rewriting processing of rewriting the program by an update program.

Specifically, the vehicle controller 21 includes a normal control part 21a, a transfer request part 21b, a rewriting part 21c, an inspection part 21d, a rewriting determination part 21e, an inhibit command output part 21f, and a data storage part 21g.

The normal control part 21a executes normal control of the hydraulic shovel 1. For example, the normal control part 21a outputs a command to the regulator for adjusting a tilt (a flow rate) of the hydraulic pump 17 so as to supply hydraulic oil to the cylinders 8 to 10 (see FIG. 1). Further, the normal control part 21a outputs a command for displaying information on the display device 16 necessary for an operator (e.g. information relating to a posture of an attachment, a remaining amount of fuel, a cooling water temperature, and the like).

The transfer request part 21b requests the communication controller 20 to transfer an update program. Further, when it is judged that transfer of an update program is to be suspended by the rewriting determination part 21e to be described later, the transfer request part 21b requests the communication controller 20 to suspend transfer of the update program. Further, when it is judged that transfer of the update program is to be resumed by the rewriting determination part 21e to be described later, the transfer request part 21b requests the communication controller 20 to resume transfer of the update program.

In response to a request from the transfer request part 21b, the program transfer part 20b of the communication controller 20 starts (including resume) to transfer an update program to the vehicle controller 21, or suspends the transfer. The update program transferred from the communication controller 20 to the vehicle controller 21 is stored in the data storage part 21g.

The rewriting part 21e rewrites a currently used program by using an update program transferred from the communication controller 20. After transfer of the update program from the communication controller 20, in a stage before program rewriting, the currently used program, and the update program transferred from the communication controller 20 are stored in individual areas of the data storage part 21g. Further, even in a stage after program rewriting, a currently used program is stored in a temporary storage area of the data storage part 21g, other than an area in which an update program (a rewritten program) is stored. Therefore, after program rewriting, when an error is detected in a rewritten program by the inspection part 21d to be described later, it is possible to return the program to a state before updating by using a program stored in a temporary storage area. A currently used program stored in a temporary storage area is deleted when an error is not detected in a rewritten program by the inspection part 21d.

The inspection part 21d performs program inspection. Specifically, the inspection part 21d inspects whether or not there is an error in an update program transferred from the communication controller 20 to the vehicle controller 21 and stored in the data storage part 21g. Further, the inspection part 21d inspects whether or not there is an error in a rewritten program stored in the data storage part 21g as described above. The inspection part 21d performs a checksum operation of checking a total value of data that is quantified in advance.

The rewriting determination part 21e determines whether or not it is possible to transfer an update program (in other words, whether or not it is possible to execute rewriting) based on a switching state of the key switch 18. Specifically, the rewriting determination part 21e determines that the hydraulic shovel 1 is in an electric power supply state when receiving an electrical signal indicating that the key switch 18 is switched to an ON position, and determines that the hydraulic shovel 1 is not in an electric power supply state when not receiving the electrical signal. In other words, the key switch 18 corresponds to an electric power supply state detector for detecting whether or not the hydraulic shovel 1 is in an electric power supply state in which electric power is supplied to an electrical component (e.g. the display device 16) mounted in the hydraulic shovel 1.

In this example, the relay 18a disposed between the key switch 18 and the vehicle controller 21 corresponds to an electric power supply inhibit unit switchable between an inhibit state in which electric power supply to an electrical component is inhibited by cutting off a circuit connected to the key switch 18, and an allowed state in which electric power supply to an electrical component is allowed by connecting the circuit.

The inhibit command output part 21f outputs an electrical command for switching the relay 18a to an inhibit position to the relay 18a. On the other hand, the relay 18a is switched to an allowed position in a state that an electrical command from the inhibit command output part 21f is not received.

Further, the inhibit command output part 21f outputs a command for switching the relay 18a to an inhibit state after transfer of an update program from the communication controller 20 to the vehicle controller 21 is completed and during execution of rewriting processing. This makes it possible to stop electric power supply to an electrical component. Therefore, it is possible to rewrite a program by using an update program in a state that activation of a function to be implemented by a currently used program is prevented.

In the following, processing to be executed by the communication controller 20 is described with reference to FIG. 3.

First of all, the communication controller 20 acquires version information of a currently used program from the vehicle controller 21 (Step R1), and determines whether or not the communication controller 20 has received version information of an update program from the server 11 (Step R2).

In this example, when the communication controller 20 determines that the communication controller 20 has not received version information of an update program (NO in Step R2), the processing is finished.

On the other hand, when the communication controller 20 determines that the communication controller 20 has received version information of an update program (YES in Step R2), the communication controller 20 determines whether or not the version of the update program is newer than the version of the currently used program (Step R3).

In this example, when the communication controller 20 determines that the version of the update program is the same or older than the version of the currently used program (NO in Step R3), the processing is finished.

On the other hand, when the communication controller 20 determines that the version of the update program is newer than the version of the currently used program, the communication controller 20 receives the update program from the server 11 (Step R4), and stores the update program in the data storage part 20a (see FIG. 2) (Step R5).

Subsequently, the communication controller 20 transmits, to the vehicle controller 21, an update notification indicating that an update program of a new version is present (Step S6), and determines whether or not the communication controller 20 has received, from the vehicle controller 21, a transfer start request requesting start to transfer the update program (Step R7).

In this example, when the communication controller 20 determines that the communication controller 20 has received a transfer start request (YES in Step R7), the communication controller 20 starts transfer of the update program to the vehicle controller 21 (Step R8).

On the other hand, when the communication controller 20 determines that the communication controller 20 has not received a transfer start request (NO in Step R7), the communication controller 20 determines whether or not the communication controller 20 has received, from the vehicle controller 21, a transfer suspend request requesting to suspend transfer of the update program to the vehicle controller 21 (Step R9).

In this example, when the communication controller 20 determines that the communication controller 20 has received a transfer suspend request (YES in Step R9), the communication controller 20 suspends to transfer the update program to the vehicle controller 21 (Step R10).

On the other hand, when the communication controller 20 determines that the communication controller 20 has not received a transfer suspend request (NO in Step R9), and when Step R10 is executed, the communication controller 20 determines whether or not the communication controller 20 has received, from the vehicle controller 21, a transfer resume request requesting to resume transfer of the update program (Step R11).

In this example, when the communication controller 20 determines that the communication controller 20 has received a transfer resume request (YES in Step R11), the communication controller 20 resumes transfer of the update program, and when the communication controller 20 determines that the communication controller 20 has not received a transfer resume request, the communication controller 20 repeatedly executes Step R7.

In Step S8 and in Step S12, when transfer of the update program is started (resumed), the communication controller 20 determines whether or not transfer of the update program is finished (Step R13).

In Step S13, when the communication controller 20 determines that transfer of the update program has not finished, the communication controller 20 repeatedly executes Step R7.

On the other hand, when the communication controller 20 determines that transfer of the update program has finished (YES in Step R13), the communication controller 20 determines whether or not the communication controller 20 has received, from the vehicle controller 21, a delete command indicating deletion of the update program stored in the data storage part 20a in Step R5 (Step R14).

In this example, when the communication controller 20 determines that the communication controller 20 has not received a delete command (NO in Step R14), the communication controller 20 repeatedly executes Step R14, and when the communication controller 20 determines that the communication controller 20 has received a delete command (YES in Step R14), the communication controller 20 deletes the update program from the data storage part 20a (Step R15), and the processing is finished.

Figure 4:
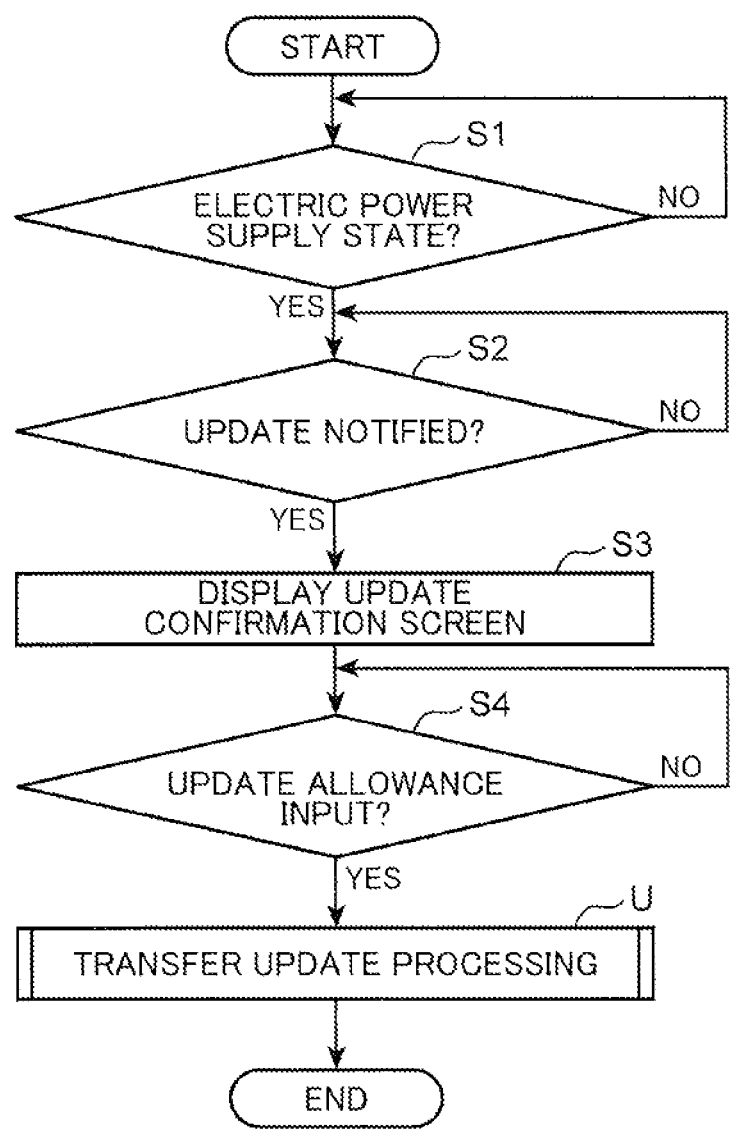
FIG. 4 is a flowchart illustrating processing to be executed by a vehicle controller illustrated in FIG. 2.

Next, referring to FIG. 2 and FIG. 4, processing to be executed by the vehicle controller 21 is described.

First of all, the vehicle controller 21 determines whether or not the hydraulic shovel 1 is in an electric power supply state (Step S1). When it is determined that the hydraulic shovel 1 is in an electric power supply state, Step S2 is executed.

In Step S2, the vehicle controller 21 determines whether or not the vehicle controller 21 has received an update notification indicating the presence of an update program from the communication controller 20. When the vehicle controller 21 determines that the vehicle controller 21 has received the notification (YES in Step S2), the vehicle controller 21 causes the display device 16 to display an update confirmation screen (Step S3).

On the update confirmation screen, there are displayed an indication that program updating is necessary, an indication that it is necessary to switch the key switch 18 to an OFF position for program updating, and an indication prompting an operator to input a reply as to whether or not updating is performed.

Subsequently, the vehicle controller 21 determines whether or not an operator has input a reply indicating program updating is allowed by using the input device 19 (Step S4).

In this example, when the vehicle controller 21 determines that there is no operator's input on a reply, the vehicle controller 21 repeatedly executes Step S4. On the other hand, when the vehicle controller 21 determines that an operator's reply is input, transfer update processing U including update program transfer processing from the communication controller 20 to the vehicle controller 21 and rewriting processing is executed.

Figure 5:
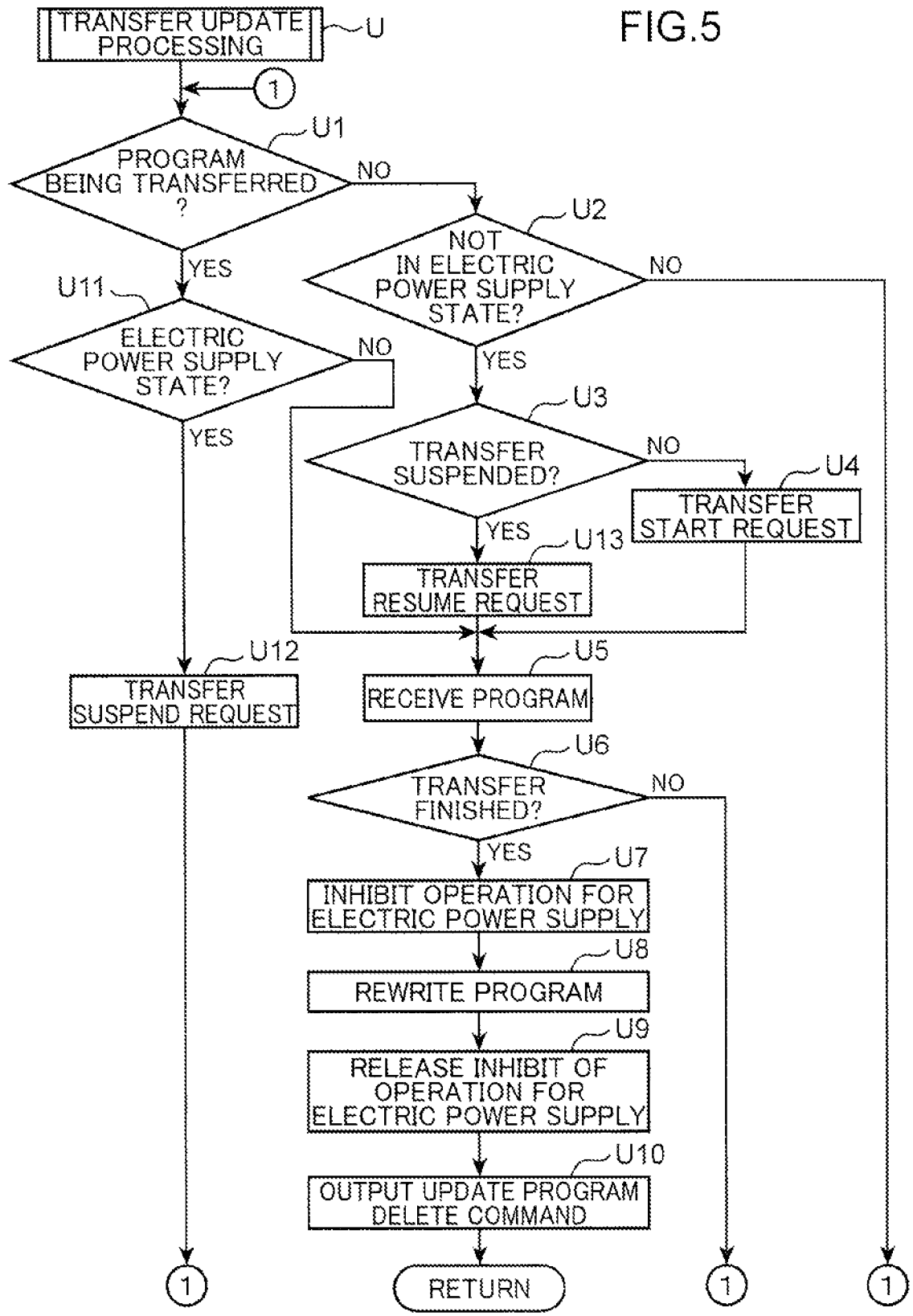
FIG. 5 is a flowchart illustrating a content of transfer update processing illustrated in FIG. 4.

FIG. 5 is a flowchart illustrating processing i.e. the transfer update processing U illustrated in FIG. 4.

Referring to FIG. 2 and FIG. 5, first of all, there is described a case where update program transfer processing and rewriting processing are executed as a series of processing without suspending transfer of an update program in the transfer update processing U.

When the transfer update processing U is started, first of all, it is determined whether or not an update program is being transferred (Step U1).

In this example, when it is determined that an update program is not being transferred (NO in Step U1), it is determined whether or not the hydraulic shovel 1 is in an electric power supply state, in other words, whether or not the key switch 18 is switched to an OFF position (Step U2).

In Step U2, when it is determined that the hydraulic shovel 1 is in an electric power supply state, Step U1 is repeatedly executed, and when it is determined that the hydraulic shovel 1 is not in an electric power supply state, it is determined whether or not transfer of the update program is suspended (Step U3).

In this example, when it is determined that transfer of the update program is not suspended (NO in Step U3), the vehicle controller 21 outputs an update program transfer start request to the communication controller 20 (Step U4). Thus, as illustrated in Steps R7 and R8 in FIG. 3, transfer of the update program from the communication controller 20 to the vehicle controller 21 is started (receiving the update program by the vehicle controller 21 is started: Step U5).

Subsequently, it is determined whether or not transfer of the update program is finished (Step U6). When it is determined that transfer is finished (YES in Step U6), a signal for switching the relay 18a to an inhibit position is output to the relay 18a (Step U7).

In this way, electric power supply to an electrical component (such as the display device 16) is stopped, and execution of a function of the control device 12, which is implemented by a currently used program, is prevented. Thus, it is possible to establish an environment appropriate for execution of rewriting processing.

In the aforementioned environment, rewriting processing is executed (Step U8). When the rewriting processing is finished, an output of a signal for switching the relay 18a to an inhibit position is stopped, in other words, the relay 18a is switched to an allowed position (Step U9).

Subsequently, a delete command indicating deletion of the update program is output to the communication controller 20 (Step U10), and the processing is finished.

In the following, there are described a case where transfer is suspended in the transfer update processing U, and a case where suspended transfer is resumed.

Specifically, when it is determined that transfer of the update program is not finished in Step U6 (NO in Step U6), it is determined that the update program is being transferred in Step U1 (YES in Step U1).

Subsequently, it is determined whether or not the hydraulic shovel 1 is in an electric power supply state (Step U11). In this example, when it is determined that the hydraulic shovel 1 is not in an electric power supply state (NO in Step U11), the processing returns to Step U5, and transfer (receiving) of the update program is continued.

On the other hand, in Step U11, when it is determined that the hydraulic shovel 1 is in an electric power supply state regardless that the update program is being transferred (YES in Step U11), a high processing power is required for the control device 12 in order to continue transfer of the update program. Specifically, the vehicle controller 21 is required to execute normal control of the hydraulic shovel 1 by the normal control part 21a, and update program rewriting processing (Step U8) concurrently. Thus, a high processing power is required for the vehicle controller 21.

In view of the above, when a determination result in Step U11 is YES, the vehicle controller 21 outputs an update program transfer suspend request to the communication controller 20 (Step U12). Thereby, as illustrated in Steps R9 and R10 in FIG. 3, transfer of the update program from the communication controller 20 to the vehicle controller 21 is suspended. Consequently, it is possible to minimize processing power required for the vehicle controller 21, since it is possible to prevent execution of rewriting processing.

Further, in Step U12, information as to which part of the update program has been transferred is stored.

When transfer is suspended as described above (Step U12), in Step U1 following Step U12, it is determined that the update program is not being transferred (NO in Step U1), and in Step U2, it is determined whether or not the hydraulic shovel 1 is in an electric power supply state.

In this example, when it is determined that the hydraulic shovel 1 is not in an electric power supply state (YES in Step U2), it is determined that transfer of the update program is suspended (YES in Step U3), and update program transfer resume is requested (Step U13).

Thus, transfer of the update program is resumed. In Step U13, transfer resume of an un-transferred part of the update program is requested, based on information stored in Step U12 (information relating to a transferred part of the update program). This is advantageous in shortening a transfer time of an update program, as compared with a case where the entirety of the update program is transferred again after transfer is suspended.

After transfer of the update program is resumed as described above, when it is determined that transfer is finished in Step U6, Steps U7 to U10 are executed, and the program is rewritten.

As described above, the communication controller 20 for storing an update program received from the server 11 is provided independently of the vehicle controller 21 for storing a currently used program.

This makes it possible to receive an update program from the server 11 while continuing to use a currently used program, and to cause the communication control 20 to store the update program. Therefore, the communication controller 20 is able to receive a new program from the server 11 while continuing operating the hydraulic shovel 1.

Further, after transfer of an update program from the communication controller 20 to the vehicle controller 21 is started, when it is detected that the hydraulic shovel 1 is in an electric power supply state, it is possible to suspend transfer.

This makes it possible to prevent in advance execution of rewriting processing by the vehicle controller 21 when the hydraulic shovel 1 is in an electric power supply state. Therefore, it is possible to prevent that the vehicle controller 21 executes processing other than rewriting processing, and the rewriting processing concurrently.

Thus, it is possible to minimize processing power consumption of the vehicle controller 21.

Further, the first embodiment provides the following advantageous effects.

It is possible to resume transfer of an update program when the hydraulic shovel 1 is not in an electric power supply state, in other words, in a state that load on the vehicle controller 21 is minimized.

By omitting an operation of transferring a transferred part of an update program again when transfer is resumed, it is possible to shorten a transfer time, as compared with a case where the entirety of the update program is transferred again.

The aforementioned configuration makes it possible to automatically create an environment (an environment in which electric power is not supplied to an electrical component) appropriate for execution of rewriting processing (Step U8) when execution of the rewriting processing is started. This is advantageous in appropriately executing rewriting processing, while simplifying a configuration of the vehicle controller 21 and reducing the cost.

Second Embodiment

In the first embodiment, after transfer of an update program is suspended, when it is determined that the hydraulic shovel 1 is not in an electric power supply state (YES in Step U2), transfer of the update program is resumed (Step U12).

However, even in a condition that the hydraulic shovel 1 is in an electric power supply state after transfer is suspended, in a condition that work by the hydraulic shovel 1 is paused, the amount of processing to be executed by the vehicle controller 21 is not so large, and load on the vehicle controller 21 is relatively small even when transfer is resumed in the aforementioned condition. When transfer of an updated part of an update program is omitted when transfer is resumed, as exemplified in the first embodiment, load on the vehicle controller 21 is significantly reduced.

Figure 6:
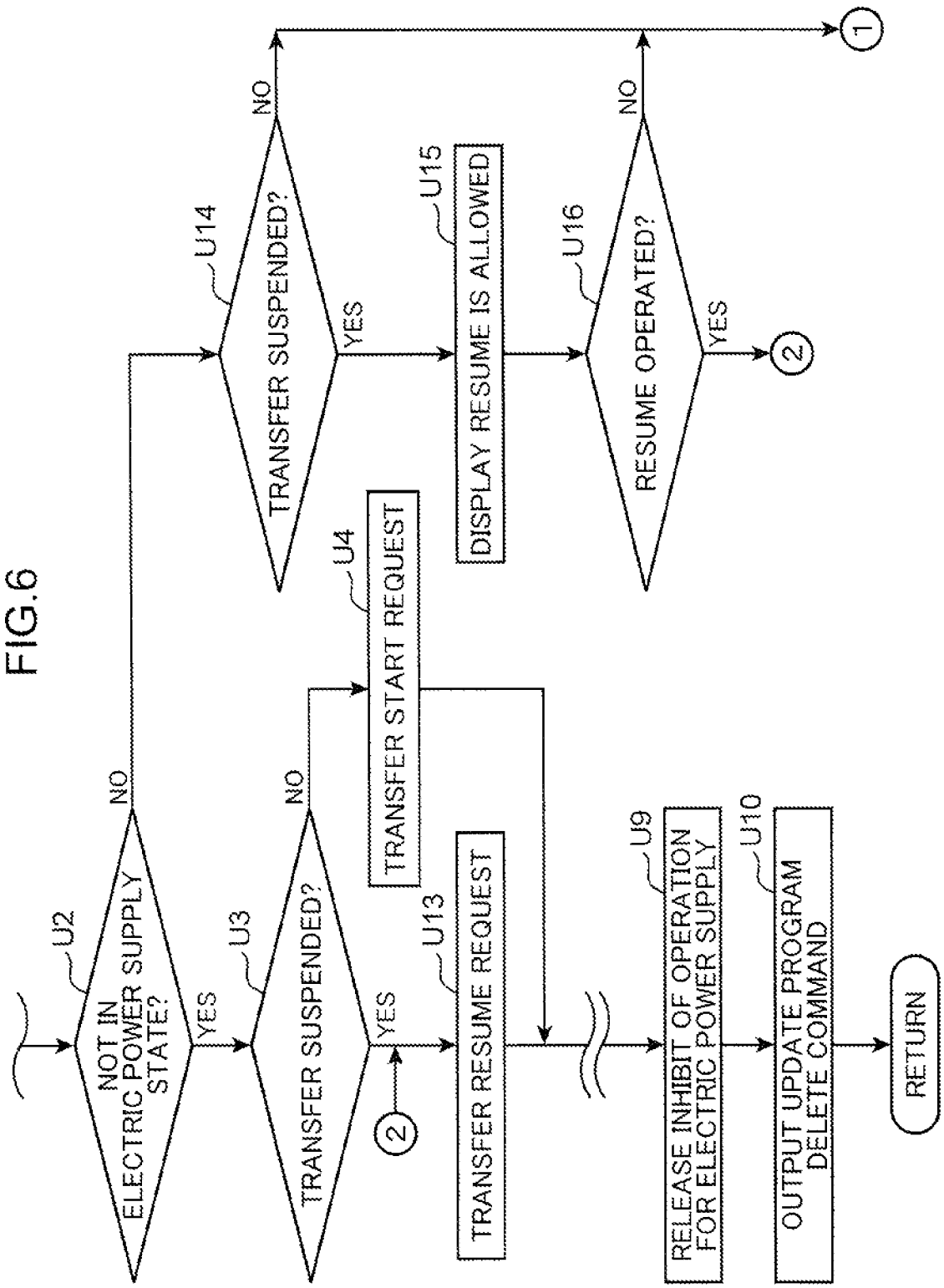
FIG. 6 is a flowchart illustrating a part of processing to be executed by a vehicle controller of a hydraulic shovel according to a second embodiment of the present invention.

In view of the above, a vehicle controller 21 of a hydraulic shovel 1 according to the second embodiment executes processing as illustrated in FIG. 6.

Specifically, after transfer of an update program is suspended, in Step U2, when it is determined that the hydraulic shovel 1 is in an electric power supply state (NO in Step U2), in Step U14, the vehicle controller 21 determines that transfer of the update program is suspended.

Subsequently, the vehicle controller 21 causes the display device 16 to display a message "it is possible to resume transfer of an update program in a condition that work by the hydraulic shovel is paused" (Step U15).

In this example, an operator determines whether or not an operation for resuming transfer is to be performed by using an input device 19, taking into consideration a work schedule using the hydraulic shovel 1.

Subsequently, the vehicle controller 21 determines whether or not an operator's operation for allowing resume is performed by using the input device 19 (see FIG. 2) (Step U16).

In this example, when the vehicle controller 21 determines that the operator's operation is performed (YES in Step U16), it is possible to resume transfer in a condition that work by the hydraulic shovel 1 is paused after transfer of the update program is suspended (Step U13).

On the other hand, when a determination result in Step U14 is NO, and when a determination result in Step U16 is NO, Step U1 (see FIG. 5) is executed, respectively. Examples of a case where a determination result in Step U16 is NO include a case where an operation of the input device 19 indicating that transfer resume is not allowed is performed, and a case where an operation of allowing resume is not performed even after lapse of a predetermined time after start of Step U16.

Third Embodiment

Figure 3:
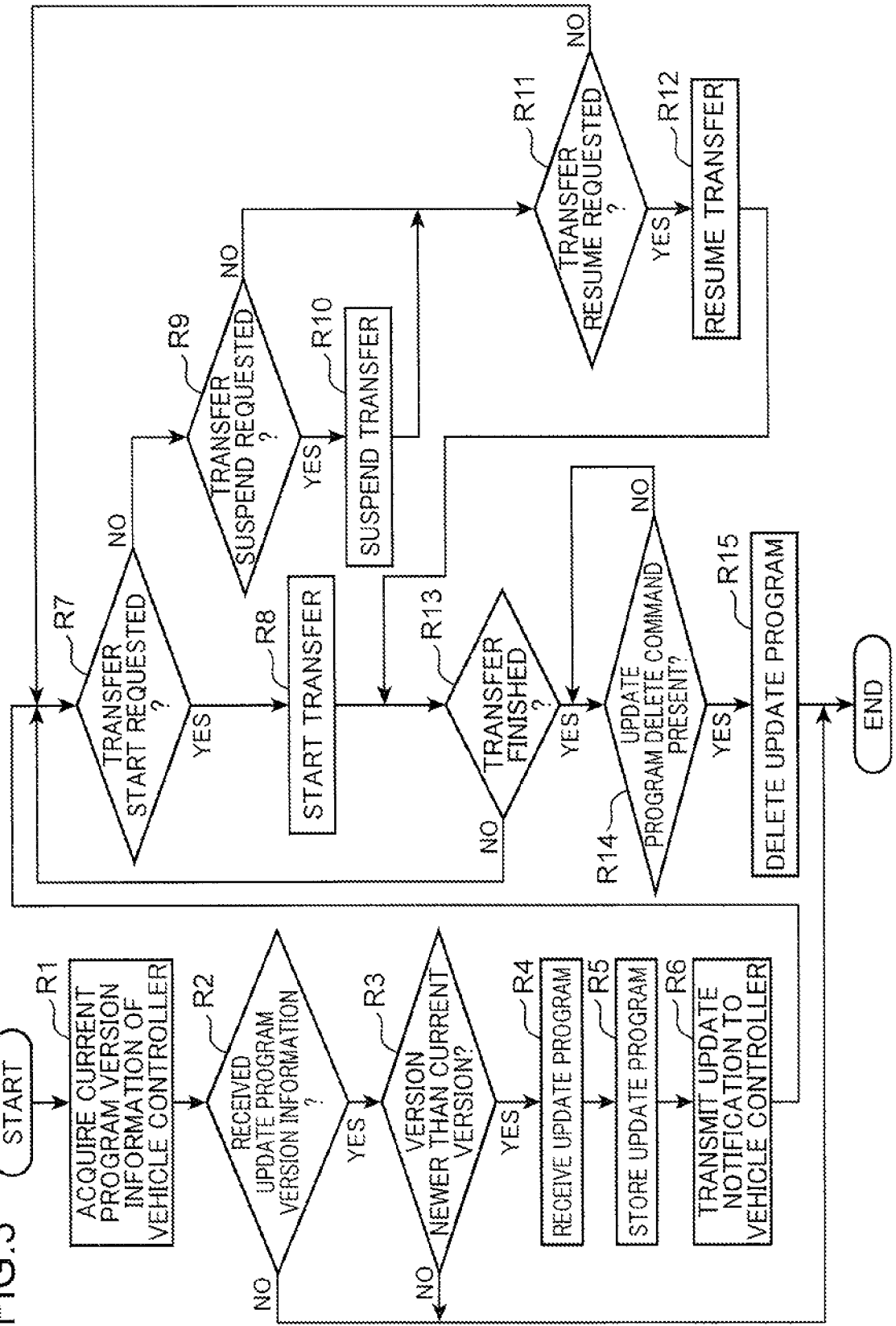
FIG. 3 is a flowchart illustrating processing to be executed by a communication controller illustrated in FIG. 2.

In the first embodiment, as illustrated in Steps R3 and R4 in FIG. 3, the communication controller 20 judges whether or not it is necessary to receive an update program based on version information of a program.

However, an element for judging whether or not it is necessary to receive an update program from a server 11 is not limited to the communication controller 20. As illustrated in the third embodiment, a vehicle controller 21 may perform the judgement. In the following, features of the third embodiment different from the features of the first embodiment are mainly described.

A communication controller 20 in the third embodiment executes processing in which Step R3 illustrated in FIG. 3 is omitted.

Specifically, after receiving version information in Step R2, the communication controller 20 receives and stores an update program in Steps R4 and R5, and transmits an update notification to the vehicle controller 21 in Step R6. In Step R6, version information of the update program is transmitted together with the update notification.

Figure 7:
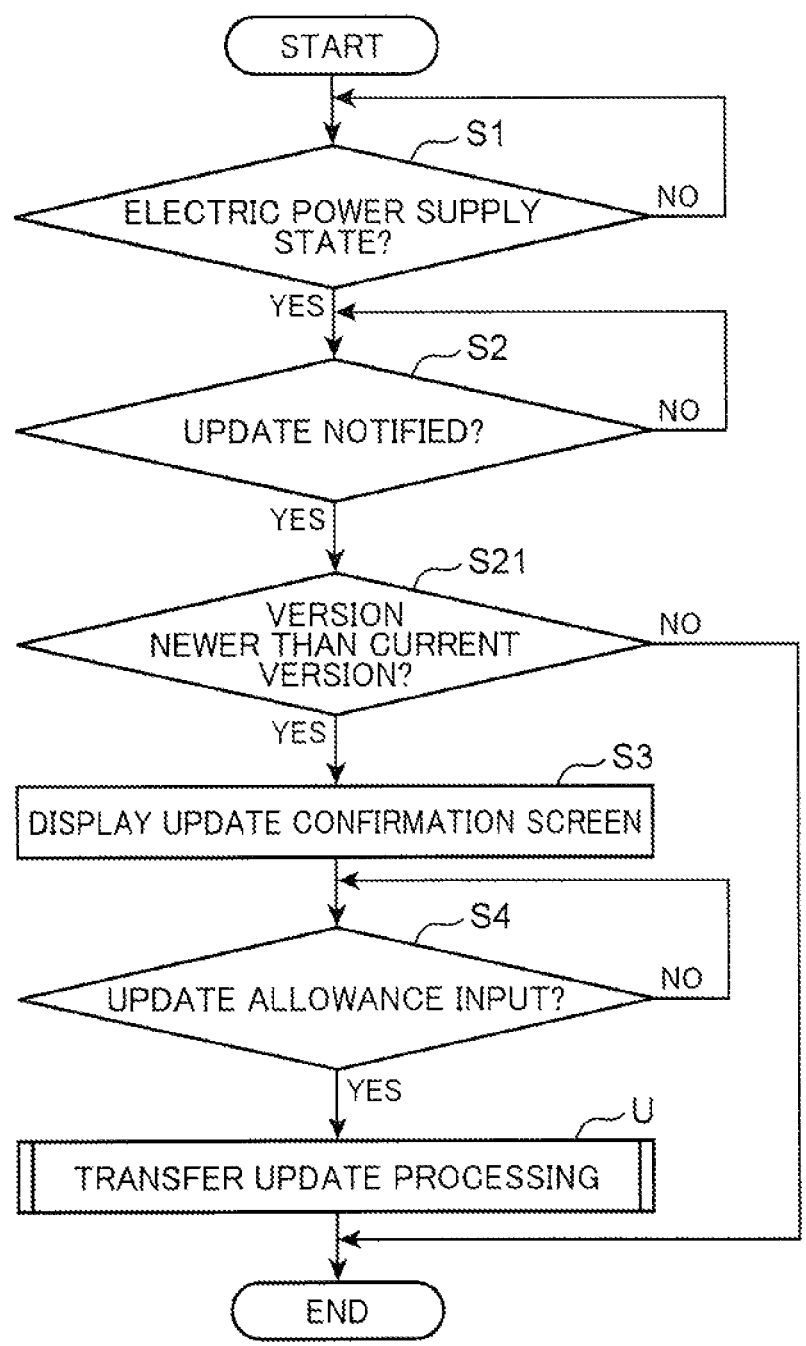
FIG. 7 is a flowchart illustrating processing to be executed by a vehicle controller of a hydraulic shovel according to a third embodiment of the present invention.

On the other hand, as illustrated in FIG. 7, in Step S2, when the vehicle controller 21 in the third embodiment determines that the vehicle controller 21 has received an update notification (YES in Step S2), the vehicle controller 21 determines whether or not the version of the update program is newer than the version of a currently used program (Step S21).

In Step S21, when the vehicle controller 21 determines that the version of the update program is the same or older than the version of the currently used program (NO in Step S21), the processing is finished.

On the other hand, in Step S21, when the vehicle controller 21 determines that the version of the update program is newer than the version of the currently used program (YES in Step S21), Step S3 is executed.

In the third embodiment, the vehicle controller 21 is able to judge whether or not it is necessary to transfer an update program (whether or not it is necessary to execute rewriting) based on version.

The present invention is not limited to the embodiments, and the following modifications may be applied, for example.

FIG. 2 illustrates the communication controller 20 and the vehicle controller 21 individually. The communication controller 20 and the vehicle controller 21 may be individually configured, or may be configured as elements on one control board.

In the embodiments, when the vehicle controller 21 determines that the hydraulic shovel 1 is in an electric power supply state during transfer of an update program, the vehicle controller 21 requests to suspend transfer of the update program.

Alternatively, the communication controller 20 may determine whether or not the hydraulic shovel 1 is in an electric power supply state during transfer of an update program, and may suspend transfer of the update program. In this case, it is necessary for a key switch 18 to be electrically connected to the communication controller 20 so that it is possible to determine whether or not the key switch 18 is switched to an ON position.

Likewise, the communication controller 20 may resume transfer of an update program when it is detected that the hydraulic shovel 1 is not in an electric power supply state after transfer is suspended.

Further, a command for switching the relay 18a to an inhibit position is output from the vehicle controller 21. Alternatively, the command may be output from the communication controller 20. In this case, it is required to electrically connect the relay 18a and the communication controller 20.

In the embodiments, the key switch 18 is exemplified as an electric power supply state detector. The electric power supply state detector is not limited to the key switch 18. For example, it is possible to use a rotation speed sensor for detecting an engine speed, and a voltage sensor detecting a voltage across terminals of an alternator, as the electric power supply state detector.

In the embodiments, an operation of transferring a transferred part of an update program again is omitted when transfer of the update program is resumed. Alternatively, the entirety of an update program may be transferred again when transfer of the update program is resumed.

In the embodiments, electric power supply to an electrical component is inhibited by the relay 18a during execution of rewriting processing. This operation may be omitted. In this case, for example, it is possible to provide a first area in which a currently used program is stored in an executable state, and a second area in which an update program is stored in an executable state thereafter individually in the vehicle controller 21. This makes it possible to execute rewriting processing while maintaining functions by the currently used program.

The program (update program) may implement one or more functions alone, or may implement one or more functions in cooperation with another program. In other words, the control device 12 (vehicle controller 21) may update the entirety of a program (a plurality of programs) which implements a predetermined function, or may update only one of a plurality of programs which implement a predetermined function.

The construction machine is not limited to a shovel. The construction machine may be a crane and a demolition machine. The construction machine is not limited to a hydraulic construction machine, and may be a hybrid construction machine or an electric construction machine.

The aforementioned specific embodiments mainly include the following features of the present invention.

In order to solve the aforementioned inconvenience, the present invention provides a construction machine including: control device having a vehicle controller for storing a currently used program and configured to execute rewriting processing of rewriting the program by an update program, and a communication controller communicative with a server including the update program via a communication means and configured to store the update program received from the server; and an electric power supply state detector for detecting whether or not the construction machine is in an electric power supply state in which electric power is supplied to an electrical component mounted in the construction machine. The control device starts transfer of the update program from the communication controller to the vehicle controller when the electric power supply state detector detects that the construction machine is not in an electric power supply state, and suspends transfer of the update program when the electric power supply state detector detects that the construction machine is in an electric power supply state after the transfer is started and before the transfer is completed.

According to the present invention, the communication controller for storing the update program received from the server is provided independently of the vehicle controller for storing the currently used program.

According to the aforementioned configuration, it is possible to cause the communication controller to receive the update program from the server while continuing to use the currently used program, and to store the update program. Therefore, the communication controller is able to receive a new program from the server while continuing operating the construction machine.

Further, according to the present invention, the control device is able to suspend the transfer when it is detected that the construction machine is in an electric power supply state after transfer of the update program from the communication controller to the vehicle controller is started.

According to the aforementioned configuration, it is possible to prevent in advance that the vehicle controller executes rewriting processing when the construction machine is in an electric power supply state. This makes it possible to prevent that the vehicle controller executes rewriting processing, and processing other than the rewriting processing concurrently.

Thus, the prevent invention is advantageous in minimizing processing power consumption of the vehicle controller.

In the present invention, the expression "not in an electric power supply state" means that electric power is not supplied to an electrical component mounted in the construction machine, but electric power is supplied to the control device.

In this example, even in a condition that the construction machine is in an electric power supply state after transfer is suspended, in a condition that work by the construction machine is paused, the amount of processing to be executed by the vehicle controller is not so large, and load on the vehicle controller is relatively small even when transfer is resumed in the aforementioned condition.

In view of the above, transfer may be resumed after the transfer is suspended and when the construction machine is in an electric power supply state, and when an operator's operation for allowing transfer resume is performed in a condition that work by the construction machine is paused.

On the other hand, in the construction machine, more preferably, the control device may resume the transfer when the electric power supply state detector detects that the construction machine is not in an electric power supply state after the transfer is suspended.

According to the aforementioned configuration, it is possible to resume transfer of the update program in a state that the construction machine is not in an electric power supply state, in other words, in a state that load on the vehicle controller is minimized.

The entirety of the update program may be transferred again when transfer is resumed. In this case, however, a time for an operation of transferring a transferred part of the update program again is required. Therefore, there occurs an inconvenience that a transfer time of the update program is extended.

In view of the above, in the construction machine, preferably, the communication controller may transfer a part of the update program other than the transferred part to the vehicle controller when the transfer is resumed after the transfer is suspended.

According to the aforementioned configuration, it is possible to shorten a transfer time, as compared with a case where the entirety of the update program is transferred again by omitting an operation of transferring the transferred part of the update program again when the transfer is resumed.

In this example, functions of the control device to be implemented by a currently used program are restricted during execution of rewriting processing. In view of the above, a first area in which a currently used program is stored in an executable state, and a second area in which an update program is stored in an executable state thereafter may be provided individually in the vehicle controller in order to execute rewriting processing while maintaining functions of the currently used program.

However, in this case, it is necessary to prepare two areas for storing programs in an executable state. This may complicate the structure of the vehicle controller, and increase the cost.

In view of the above, preferably, the construction machine may further include an electric power supply inhibit unit switchable between an inhibit state in which electric power supply to the electrical component is inhibited, and an allowed state in which the electric power supply is allowed. The control device may output a command for causing the electric power supply inhibit unit to switch to the inhibit state after the transfer is completed and during execution of the rewriting processing.

According to the aforementioned configuration, it is possible to automatically create an environment (an environment in which electric power is not supplied to an electrical component) appropriate for execution of rewriting processing when execution of the rewriting processing is started. This is advantageous in appropriately executing rewriting processing while simplifying a configuration of the vehicle controller and reducing the cost.

Further, the present invention provides a program rewriting system including: a server having an update program; and the construction machine. The control device of the construction machine starts transfer of the update program from the communication controller to the vehicle controller when the electric power supply state detector detects that the construction machine is not in the electric power supply state, and suspends transfer of the update program when the electric power supply state detector detects that the construction machine is in the electric power supply state after the transfer is started and before the transfer is completed.

The invention claimed is:

1. A construction machine, comprising:
   an engine for generating a power to drive the construction machine;
   a starter connected with the engine for starting the engine;
   an alternator connected with the engine for generating electric power by using the power of the engine;
   an electric power storage device connected with the alternator for storing electric power generated by the alternator;
   a display connected with the electric power storage device for displaying a presence of an update program;
   an input device for allowing an operator to input an operative instruction;
   a vehicle controller for storing a currently used program and configured to execute rewriting processing of rewriting the currently used program by an update program;
   a communication controller that is communicative with a server and configured to:
   receive the update program from a server, and
   store the update program received from the server; and
   an electric power supply switch for switching between a first electric power supply state in which electric power is supplied to the display, the vehicle controller, and the communication controller from at least one of the alternator and the electric power storage device and a second electric power supply state in which electric power is supplied to the vehicle controller and the communication controller from the electric power storage device while suspending supply of electric power to the starter and the display; an electric power supply inhibit unit switchable between an inhibit state in which the first electric power supply state is inhibited, and an allowed state in which the first electric power supply state is allowed;
   wherein the communication controller includes:
     a data storage part for storing the update program transferred from the server, the transfer from the server occurring when the electric supply switch is in either the first electric power supply state or the second electric power supply state, and
     a program transfer part for transferring the update program stored in the data storage part to the vehicle controller in response to a request from the vehicle controller, and
   wherein the vehicle controller includes:
     a normal control part for executing normal control of the construction machine,
     a data storage part for storing the currently used program and the update program,
     a transfer request part for requesting a transfer of the update program, a rewriting part for rewriting the currently used program by the update program, after
the update program is transferred to the data storage part of the vehicle controller, and
the electric power supply inhibit unit is in the inhibit state
a rewriting determination part, connected to the electric power supply switch for:
starting transfer of the update program, from the data storage part of the communication controller to the data storage part of the vehicle controller, after:
the display that indicates program updating is necessary, and
the operator inputs into the input device a reply indicating program updating is allowed, and
suspending the transfer of the update program, from the data storage part of the communication controller to the data storage part of the vehicle controller, when the electrical supply switch changes from a second electric power supply state to a first electric power supply state, after the transfer of the update program, from the data storage part of the communication controller to the data storage part of the vehicle controller is started and before the transfer is completed.

2. The construction machine according to claim 1, wherein the rewriting determination part resumes the transfer when the electrical supply switch changes from the first electric power supply state to the second electric power supply state.

3. The construction machine according to claim 2, wherein
the program transfer part transfers a part of the update program other than the already transferred part to the vehicle controller when the transfer is resumed after the transfer is suspended.

4. A program rewriting system, comprising:
a server including an update program; and
the construction machine according to claim 1, wherein
the rewriting determination part starts transfer of the update program from the data storage part of the communication controller to the data storage part of the vehicle controller when coming into the second electric power supply state, and suspends transfer of the update program when coming into the first electric power supply state after the transfer is started and before the transfer is completed.

* * * * *